(12) United States Patent
Cheng et al.

(10) Patent No.: US 12,738,568 B2
(45) Date of Patent: Sep. 15, 2026

(54) BATTERY PACK AND ELECTRICAL DEVICE

(71) Applicant: CALB Group Co., Ltd., Jiangsu (CN)

(72) Inventors: Deyong Cheng, Changzhou (CN); Jianpeng Wang, Changzhou (CN); Bowei Xu, Changzhou (CN)

(73) Assignee: CALB Group Co., Ltd., Jiangsu (CN)

( * ) Notice: Subject to any disclaimer, the term of this patent is extended or adjusted under 35 U.S.C. 154(b) by 625 days.

(21) Appl. No.: 18/180,137

(22) Filed: Mar. 8, 2023

(65) Prior Publication Data

US 2024/0162529 A1 May 16, 2024

(30) Foreign Application Priority Data

Nov. 14, 2022 (CN) ........................ 202211419200.1

(51) Int. Cl.
*H01M 10/6568* (2014.01)
*H01M 10/613* (2014.01)
*H01M 50/209* (2021.01)

(52) U.S. Cl.
CPC ..... *H01M 10/6568* (2015.04); *H01M 10/613* (2015.04); *H01M 50/209* (2021.01)

(58) Field of Classification Search
CPC ........... H01M 10/6568; H01M 10/613; H01M 50/209
See application file for complete search history.

(56) References Cited

U.S. PATENT DOCUMENTS

2024/0226621 A1* 7/2024 Kim ......................... A62C 3/16

FOREIGN PATENT DOCUMENTS

| | | | |
|---|---|---|---|
| CN | 209104233 | 7/2019 | |
| CN | 209662489 | 11/2019 | |
| CN | 112331990 | 2/2021 | |
| CN | 112332013 | 2/2021 | |
| WO | WO-2021057280 A1 * | 4/2021 | ........ H01M 10/6568 |

OTHER PUBLICATIONS

English Translation of WO 2021057280 A1 (Year: 2021).*
"Office Action of China Counterpart Application", issued on Dec. 22, 2022, with English translation thereof, pp. 1-11.

* cited by examiner

*Primary Examiner* — Daniel P Malley, Jr.
*Assistant Examiner* — Anna G. Newell
(74) *Attorney, Agent, or Firm* — JCIP GLOBAL INC.

(57) ABSTRACT

The disclosure relates to the technical field of batteries, and in particular to a battery pack and an electrical device. The battery pack includes: a plurality of battery cells, any of which is provided with a fragile portion; and a spray pipeline, which is arranged on one side of the battery cell where the fragile portion is arranged. The spray pipeline is provided with an injection portion, and the injection portion abuts against the fragile portion. The fragile portion is impacted by a thermal runaway heat flow of the battery cell to form a pressure relief port, and the injection portion forms an injection port under the action of the thermal runaway heat flow, so that the cooling medium in the spray pipeline flows out from the injection port.

11 Claims, 4 Drawing Sheets

A

BATTERY PACK AND ELECTRICAL DEVICE

CROSS-REFERENCE TO RELATED APPLICATION

This application claims the priority benefit of China application no. 202211419200.1, filed on Nov. 14, 2022. The entirety of the above-mentioned patent application is hereby incorporated by reference herein and made a part of this specification.

BACKGROUND

Technical Field

The present disclosure relates to the technical field of batteries, and in particular to a battery pack and an electrical device.

Description of Related Art

A battery cell needs to be at a suitable temperature during use to ensure normal use of the battery cell. When multiple battery cells are arranged side by side to form a battery pack, if a single battery cell has been charged and discharged many times, the battery cell might generate heat in an abnormal way, and a large amount of heat generated by the battery cell will be transferred to adjacent battery cells and cause a chain reaction. The chain reaction will cause abnormalities in other battery cells, causing greater damage, and eventually leading to thermal runaway of the entire battery pack and causing accidents.

In a known battery pack, in order to reduce the probability of chain reaction, a spray pipeline may be disposed above the fragile portion of each battery cell to spray liquid and cool down the battery cell when an abnormality occurs in one of the battery cells. When this approach is adopted, the cooling medium in the spray pipeline will flow out in a spraying manner and spreads around, the cooling efficiency is low, and the problem of short circuit of other battery cells might be caused.

SUMMARY

The present disclosure discloses a battery pack and an electrical device.

A battery pack includes: a plurality of battery cells, any of which is provided with a fragile portion; a spray pipeline, which is arranged on one side of the battery cell where the fragile portion is arranged, the spray pipeline is provided with an injection portion, and the injection portion abuts against the fragile portion; the fragile portion is impacted by a thermal runaway heat flow of the battery cell to form a pressure relief port, and an injection portion forms an injection port under the action of the thermal runaway heat flow, so that the cooling medium in the spray pipeline flows out from the injection port.

The present disclosure further provides an electrical device, the electrical device includes the above-mentioned battery pack, and the battery pack includes a plurality of battery cells arranged side by side, and a spray pipeline. Any battery cell is provided with a fragile portion, and the spray pipeline is disposed on one side surface of the battery cell provided with the fragile portion, and the spray pipeline is provided with an injection portion, and the injection portion and the fragile portion are abutted against each other.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
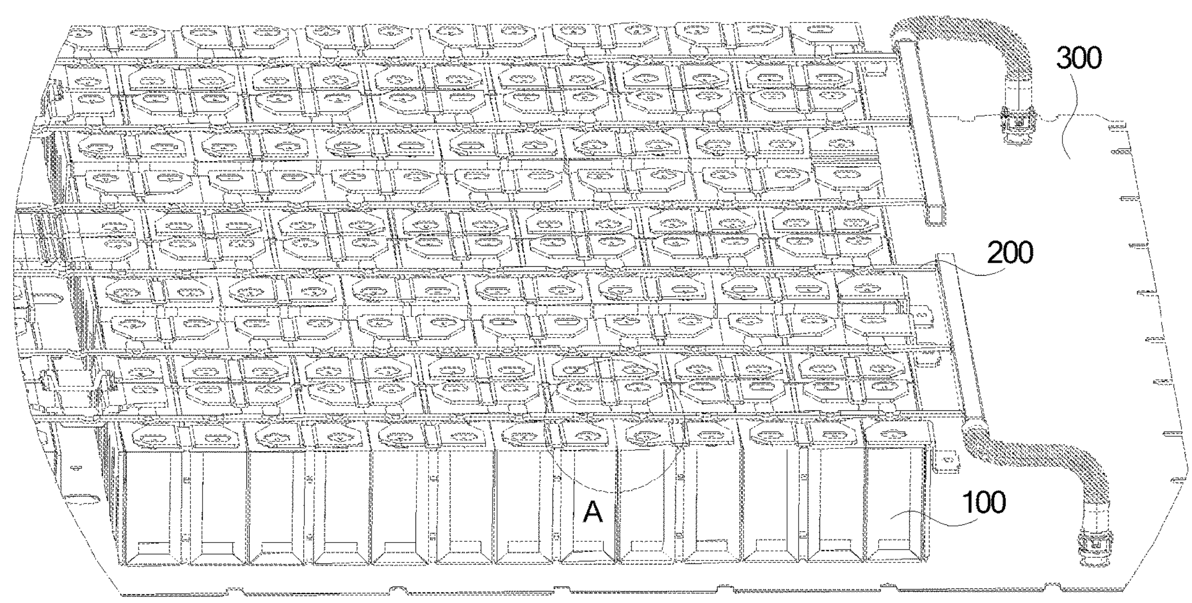
FIG. 1 is a schematic structural view of a battery pack according to an embodiment of the present disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In the battery pack provided by the present disclosure, when thermal runaway occurs in one of the battery cells, the heat flow generated by the thermal runaway breaks through the fragile portion to form a pressure relief port, and the thermal runaway heat flow continues to act on the injection portion of the spray pipeline. The injection portion is affected by the action of heat flow to form the injection port, and the cooling medium in the spray pipeline is sprayed out through the injection port. Since the injection portion and the fragile portion are abutted against each other, by selecting a suitable contact area, the portion where the fragile portion is broken may be positioned. Moreover, the injection port formed on the spray pipeline directly faces the pressure relief port of the fragile portion, so that the cooling medium may be injected into the interior of the core of the battery cell where thermal runaway occurs through the injection port and the pressure relief port, and the cooling efficiency of the cooling medium is improved through precise drainage. In this structure, the cooling medium sprayed from the spray pipeline may be injected into the battery more accurately, effectively avoiding the spread of the cooling medium, and further avoiding the short circuit of other single cells caused by the spreading of the cooling medium.

In the electrical device provided by the present disclosure, when any battery cell undergoes thermal runaway, the fragile portion is broken through by the heat flow generated by the thermal runaway to form a pressure relief port, and the heat flow continues to act on the injection portion so that the injection portion is broken through to form an injection port, so that the cooling medium in the spray pipeline is injected into the interior of the battery cell from the injection port and the pressure relief port, preventing the cooling medium from spreading around, improving the cooling efficiency, and thereby suppressing the thermal runaway of the battery pack. Therefore, the electrical device has improved safety performance.

Figure 2:
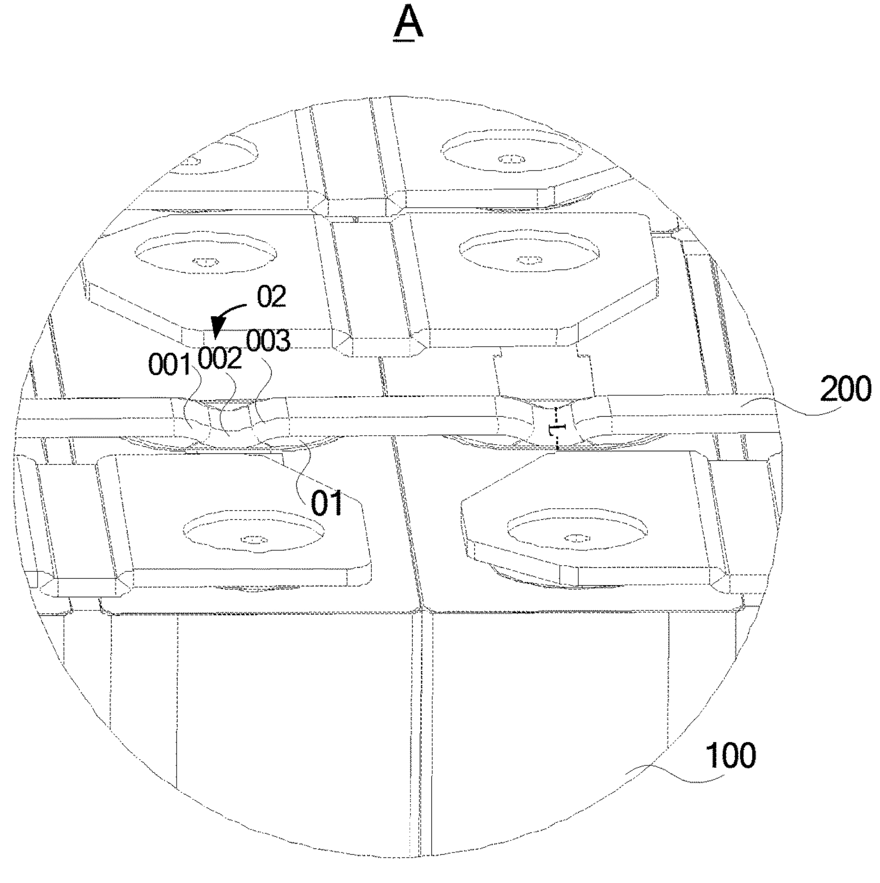
FIG. 2 is a partial enlarged view of place A shown in FIG. 1.

FIG. 1 is a schematic structural view of a battery pack according to an embodiment of the present disclosure. FIG. 2 is a partial enlarged view of place A shown in FIG. 1. Please refer to FIG. 1 and FIG. 2, an embodiment of the present disclosure provides a battery pack, which includes: a plurality of battery cells 100 arranged side by side, and a spray pipeline 200. Any one of the battery cells 100 is provided with a fragile portion 01. The spray pipeline 200 is arranged on one side of the battery cell 100 where the fragile portion 01 is arranged. The spray pipeline 200 is provided with an injection portion 02, and the injection portion 02 is abutted against the fragile portion 01. The fragile portion 01 is impacted by the thermal runaway heat flow of the battery cell 100 to form a pressure relief port, and the injection portion 02 forms an injection port under the action of the thermal runaway heat flow, so that the cooling medium in the spray pipeline 200 flows out from the injection port. In this manner, the temperature of the battery cell 100 in which thermal runaway occurs is lowered, thus improving the usage efficiency of the cooling medium. The abutment of the injection portion 02 and the fragile portion 01 may locate the position where fragile portion 01 forms a pressure relief port.

Referring to FIG. 1, the spray pipeline 200 communicates with a liquid cooling plate 300 inside the battery pack, so that the spray pipeline 200 is provided with a flowing cooling medium through the liquid cooling plate 300.

Referring to FIG. 2, the spray pipeline 200 is abutted against a cover plate of the battery cell 100, so as to prevent the cooling medium from flowing away from the pores between the spray pipeline 200 and the cover plate of the battery cell 100 and spreading around, thereby improving the utilization of the cooling medium. In the meantime, this structure may prevent the heat flow injected from the pressure relief port of the battery cell 100 from flowing to the side surface of the battery cell 100 and causing thermal runaway of adjacent battery cells 100, thereby reducing the risk of spreading of thermal runaway.

Figure 3:
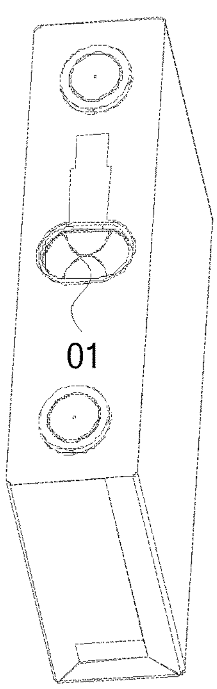
FIG. 3 is a schematic structural view of a battery cell according to an embodiment of the present disclosure.
Figure 4:
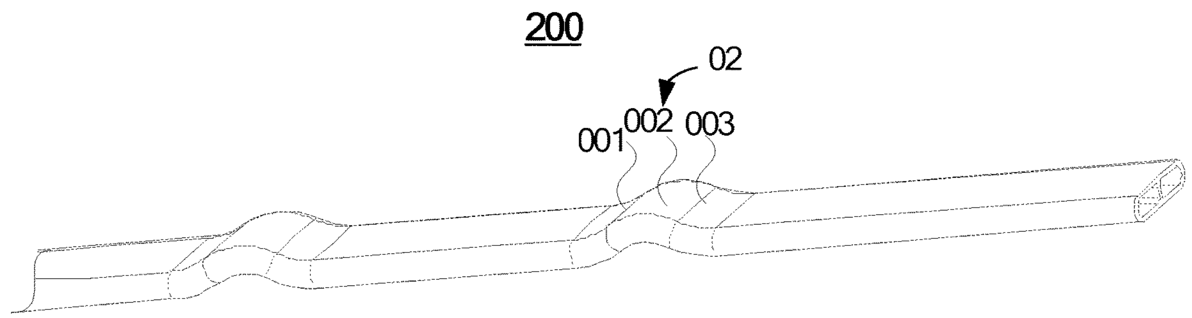
FIG. 4 is a schematic structural view of a spray pipeline according to an embodiment of the present disclosure.

FIG. 3 is a schematic structural view of a battery cell according to an embodiment of the present disclosure. FIG. 4 is a schematic structural view of a spray pipeline according to an embodiment of the present disclosure. Referring to FIG. 2 to FIG. 4 together, the fragile portion 01 is a groove provided on the housing of the battery cell 100, and the bottom of the groove is provided to form a pressure relief port under the impact of thermal runaway heat flow. The injection portion 02 is a protruding portion protruding in the direction from the spray pipeline 200 to the groove. The protruding portion abuts against the bottom of the groove, that is, the injection portion 02 protrudes into the groove, so that the height of the injection port is lower than that of the top surface of the battery cell 100 along the height direction of the battery cell 100. In this manner, when the thermal runaway occurs in the battery cell 100, the cooling medium flowing out from the injection portion 02 gathers in the groove, and enters the interior of the battery cell 100 through the pressure relief port, thereby avoiding the spreading of the cooling medium to improve cooling efficiency.

In an optional embodiment, the fragile portion may be an explosion-proof valve provided on the top surface of the battery cell. In another embodiment of the present disclosure, the fragile portion may reduce the strength of the housing of the fragile portion by providing notches on the housing of the battery cell or reducing the thickness of the fragile portion and so on.

During the transportation of the battery pack, in order to avoid damage caused by friction or impact between the protruding portion and the fragile portion under vibration conditions, when the protruding portion is arranged, the protruding portion may include a pipeline body and a buffer layer disposed on a side surface of the pipeline body facing the fragile portion. The buffer layer may absorb the impact energy during the vibration, thereby reducing the wear of the protruding portion and the fragile portion. The buffer layer may be a polyethylene foam layer, a polystyrene foam layer or a rubber layer and the like.

The material of the spray pipeline is not limited in this disclosure, and the spray pipeline may be a metal pipe or a plastic pipe. Preferably, the spray pipeline is an aluminium pipe or an aluminium alloy pipe. It can be understood that when the spray pipeline is a metal pipe, the part of the spray pipeline corresponding to the fragile portion is punched downward to form a protruding portion. The strength of the metal pipe wall corresponding to a transition portion between the protruding portion and the pipeline body is lower than that of other parts of the spray pipeline, so the metal pipe wall is more likely to be broken by the heat flow of thermal runaway to form an injection port. In addition, through processing, the toughness of the pipeline body at the protruding portion is higher than that of other parts of the spray pipeline, so as to prevent the protruding portion from damaging the fragile portion of the battery under vibration conditions. In this way, it is possible to reduce wear of the protruding portion under vibration conditions, and prolong the service life of components.

Continuing to refer to FIG. 2 and FIG. 4, the protruding portion is an arc-shaped protruding portion. Along the extending direction of the spray pipeline, the injection portion 02, that is, the protruding portion, includes a first transition segment 001, a protruding segment 002 and a second transition segment 003 connected in sequence. The first transition segment 001 and the second transition segment 003 are symmetrically arranged at both ends of the protruding segment 002. The protruding portion may also be of other shapes, such as rectangular. Compared with a protruding portion of other shapes, the manufacturing process of the arc-shaped protruding portion is simpler.

The protruding portion and the fragile portion 01 are in line contact or surface contact. Preferably, the protruding portion and the fragile portion 01 are in line contact, and the contact line L formed by the abutment between the protruding portion and the fragile portion 01 is perpendicular to the extending direction of the spray pipeline 200.

When the thermal runaway occurs in the battery cell, with the abutment line L as the axis, the two ends of the fragile portion explode toward the first transition segment and the second transition segment of the spray pipeline to form a pressure relief port, which realizes the positioning of the broking position of the fragile portion. Then, the heat flow is sprayed along the extending direction of the spray pipeline instead of along the cross-section extending direction of the spray pipeline, thus reducing the risk of the spray pipeline being cut by the heat flow.

In the optional solution of this embodiment, when the thermal runaway heat flow impacts on the injection portion 02, the injection portion 02 cracks along the abutment line L to form an injection port, so that the distance between the injection port and the fragile portion 01 is minimized, and the cooling medium enters the interior of the battery cell 100 through the pressure relief port in a more precise way.

In an optional solution of this embodiment, the spray pipeline extends along the arrangement direction of the plurality of battery cells, and the spray pipeline is arranged on one side surface of the battery cells, so that the temperature of the battery cells may be directly lowered through heat exchange. In addition, the spray pipeline has multiple injection portions, and each of the injection portions respectively corresponds to the fragile portion of each of the battery cells. When thermal runaway occurs in any one of the battery cells, the heat flow generated by the thermal runaway breaks through the fragile portion, and then impacts on the injection portion of the spray pipeline corresponding to the battery cell through the pressure relief port, and the injection portion is affected by the heat flow to form an injection port. In this way, the cooling medium flows out through the injection port, and enters the interior of the battery cell through the pressure relief port, so as to prevent the cooling medium from spreading around, thereby improving the usage efficiency of the cooling medium.

In an optional embodiment, a thermal insulation pad may be provided between any two adjacent single cells, so as to further reduce the influence of the battery cell undergoing thermal runaway on other battery cells. By arranging the thermal insulation pad and the precise spraying of the cooling medium in the spray pipeline, it is possible to suppress the spread of thermal runaway quickly, thereby effectively preventing large-scale thermal runaway of the battery pack, and improving the safety performance of the battery pack.

Based on the same inventive concept, an embodiment of the present disclosure further provides an electrical device, where the electrical device includes the battery pack in various possible embodiments of the present disclosure. Therefore, the electrical device also has improved safety performance.

The electrical device may be an electric vehicle or an electronic device or the like.

EXAMPLES

The following examples describe the present disclosure more specifically, and these examples are for illustrative purposes only, because various modifications and changes within the scope of the present disclosure will be obvious to those skilled in the art. Unless otherwise stated, all reagents used in the examples are commercially available or synthesized according to conventional methods, and can be used directly without further treatment, and the instruments used in the examples are all commercially available.

Example 1

Figure 5:
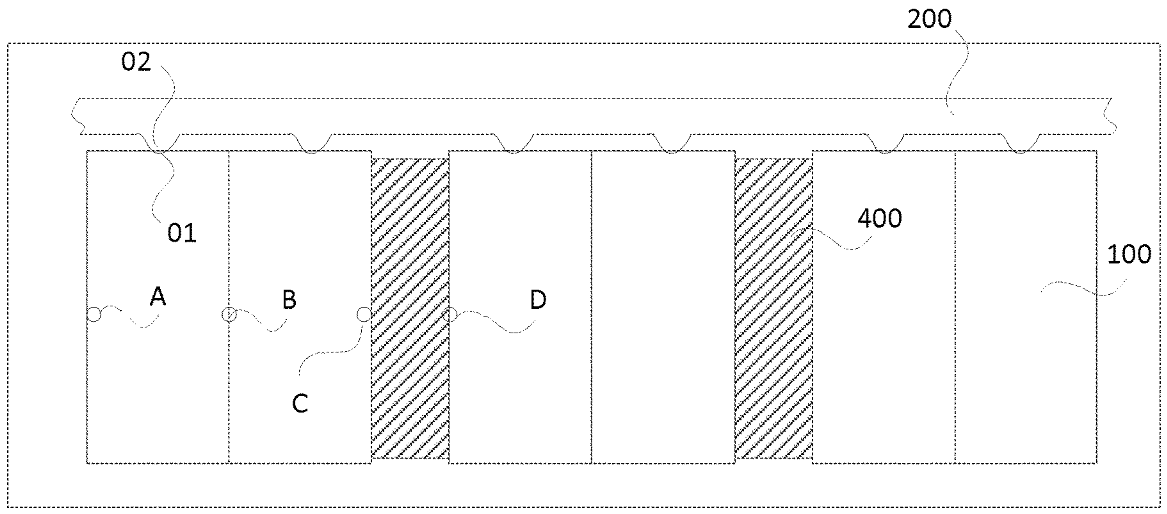
FIG. 5 is a schematic structural view of the battery pack in Example 1 of the present disclosure.

Example 1 is a battery pack. Referring to FIG. 5, the battery pack includes a plurality of battery cells 100 and a spray pipeline 200. A thermal insulation pad 400 is provided at intervals between every two battery cells 100, that is, every two adjacent battery cells 100 is a module. The fragile portion 01 of the battery cell 100 is a groove provided on the housing of the battery cell 100, that is, an explosion-proof sheet, and the injection portion 02 of the spray pipeline 200 abuts against the fragile portion 01 of the battery cell 100.

Comparative Example 1

Figure 6:
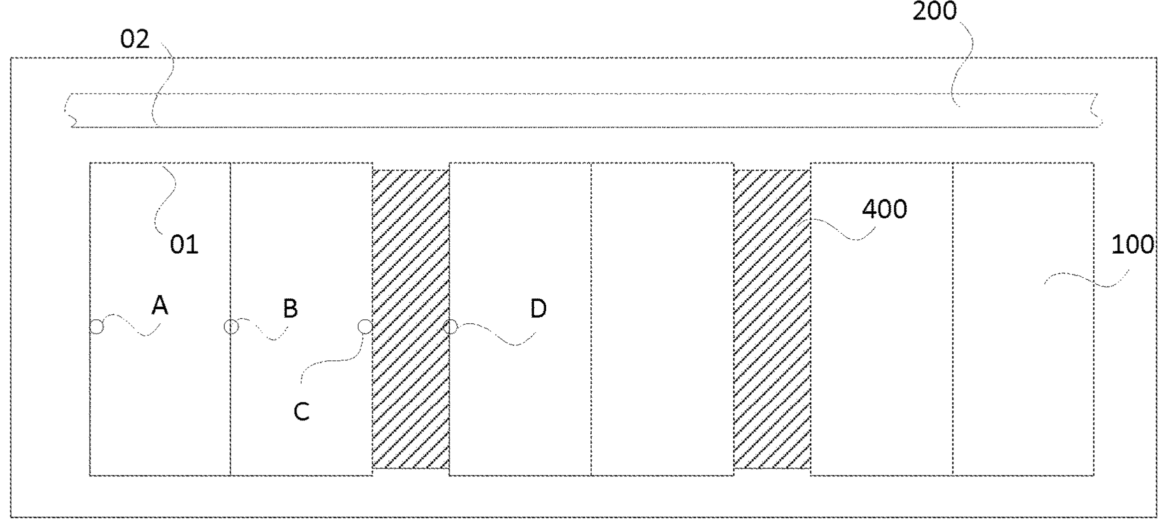
FIG. 6 is a schematic structural view of the battery pack in Comparative Example 1 of the present disclosure.

Comparative Example 1 is a battery pack. Referring to FIG. 6, the battery pack includes a plurality of battery cells 100 and a spray pipeline 200. A thermal insulation pad 400 is provided at intervals between every two battery cells 100, that is, every two adjacent battery cells 100 is a module. The fragile portion 01 of the battery cell 100 is a groove provided on the housing of the battery cell 100, that is, an explosion-proof sheet, and a distance between the injection portion 02 of the spray pipeline 200 and the fragile portion 01 of the battery cell 100 is 3.5 mm.

Figure 7:
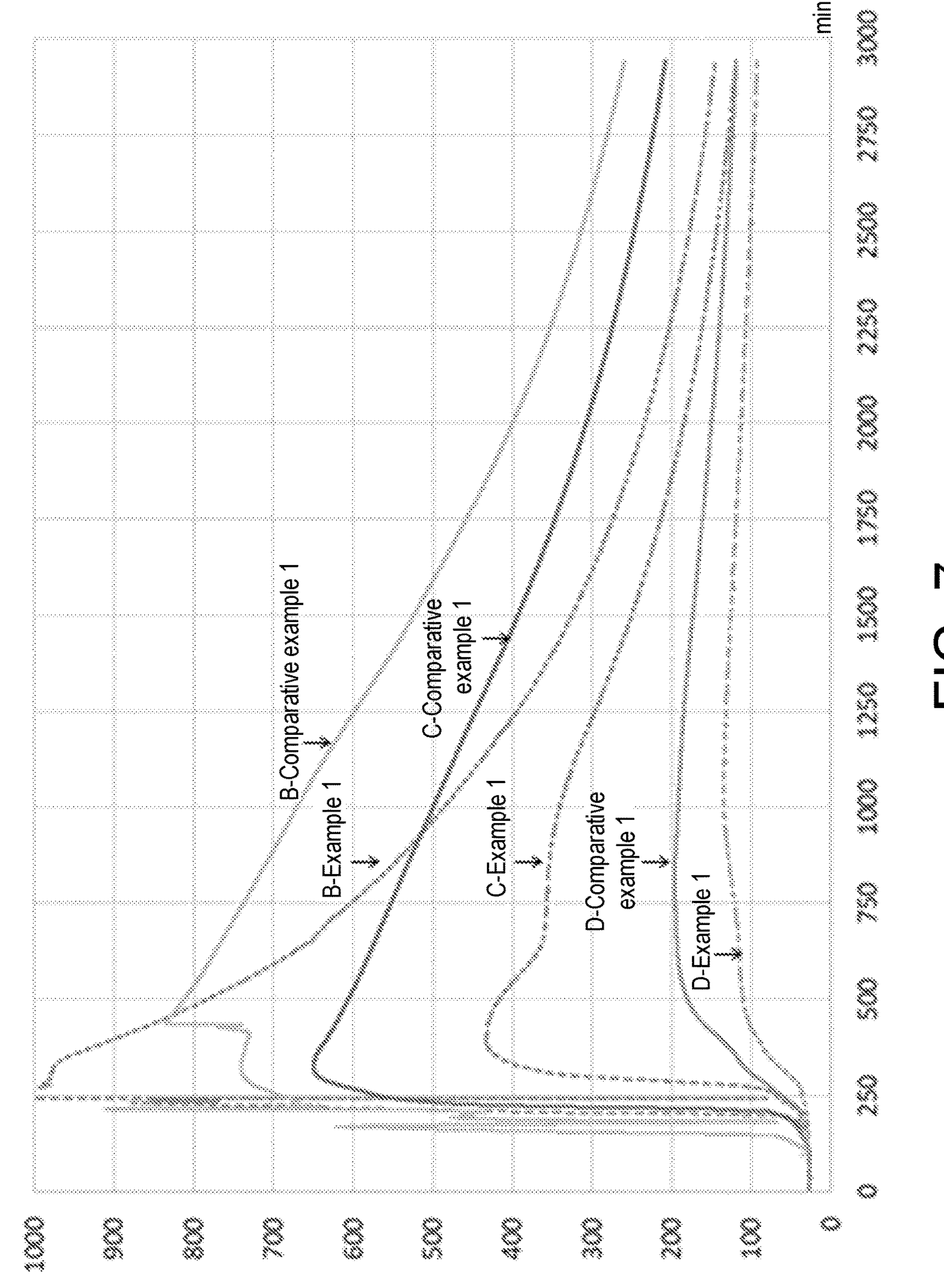
FIG. 7 is a comparison chart of the thermal runaway temperature of the battery packs in Example 1 and Comparative Example 1 of the present disclosure.

Tests were carried out on the battery packs in Example 1 and Comparative Example 1 to verify the thermal suppression effect of the spray pipeline after the thermal runaway occurs in the battery cells. The specific test conditions are as follows:

The test was carried out in a sealed box. Place A of the battery cell 100 is a trigger position of thermal runaway. The central position of the module where thermal runaway occurs is marked as B. Along the arrangement direction of the battery cells 100, the terminal end position of the module undergoing thermal runaway is marked as C. The position of the module adjacent to the module undergoing thermal runaway close to the position C is marked as D. The fragile portion 01 of the battery cell 100 is broken through by the heat flow of the thermal runaway to form a pressure relief port, and the heat flow continues to act on the injection portion 02 of the spray pipeline 200 through the pressure relief port. The injection portion 02 forms an injection port under the impact of heat flow, and the cooling medium in the spray pipeline 200 cools the battery cell 100. The temperatures at the places B, C, and D of the battery pack in Example 1 and Comparative Example 1 were monitored respectively in different time periods. FIG. 7 is a comparison chart of the thermal runaway temperature of the battery packs in Example 1 and Comparative Example 1 of the present disclosure. Referring to FIG. 7, compared with Comparative Example 1, the cooling effect of the battery pack in Example 1 after thermal runaway is more obvious, and the effect of suppressing spread of heat is improved.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising:

a plurality of battery cells, any of which is provided with a fragile portion;

a spray pipeline, which is disposed on one side of the battery cell where the fragile portion is disposed, wherein the spray pipeline is provided with an injection portion, and the injection portion abuts against the fragile portion;

wherein the fragile portion is impacted by a thermal runaway heat flow of the battery cell to form a pressure relief port, and the injection portion forms an injection port under an impact of the thermal runaway heat flow, so that a cooling medium in the spray pipeline flows out from the injection port, wherein the fragile portion is a groove provided on a housing of the battery cell, and a bottom of the groove is provided to form the pressure relief port under the impact of the thermal runaway heat flow;

the injection portion is a protruding portion protruding in a direction from the spray pipeline to the groove, and the protruding portion abuts against the bottom of the groove, wherein a height of the injection port is lower than a height of a top surface of the battery cell along a height direction of the battery cell, wherein the protruding portion is an arc-shaped protruding portion, along an extending direction of the spray pipeline, the protruding portion comprises a first transition segment, a protruding segment and a second transition segment connected in sequence, and the protruding portion protrudes toward the fragile portion, wherein the spray pipeline is a metal pipe, a strength of a wall of the metal pipe corresponding to a transition portion between the protruding portion and other parts of the spray pipeline is lower than a strength of parts of the spray pipeline other than the transition portion, and a toughness of the protruding portion is higher than a toughness of parts of the spray pipeline other than the protruding portion.

2. The battery pack according to claim 1, wherein the spray pipeline is abutted against a cover plate of the battery cell.

3. The battery pack according to claim 1, wherein the protruding portion comprises a pipeline body and a buffer layer disposed on a side surface of the pipeline body facing the fragile portion.

4. The battery pack according to claim 1, wherein the protruding portion and the fragile portion are in line contact or surface contact.

5. The battery pack according to claim 4, wherein the protruding portion and the fragile portion are in line contact, and a contact line between the protruding portion and the fragile portion is perpendicular to the extending direction of the spray pipeline.

6. The battery pack according to claim 5, wherein when the thermal runaway heat flow impacts on the protruding segment of the injection portion, the first transition segment and the second transition segment form the injection port.

7. The battery pack according to claim 5, wherein when the thermal runaway heat flow impacts on the protruding segment of the injection portion, the first transition segment or the second transition segment form the injection port.

8. The battery pack according to claim 1, wherein the spray pipeline extends along an arrangement direction of the plurality of battery cells, and the spray pipeline is provided with a plurality of the injection portions, and each of the injection portions respectively corresponds to the fragile portion of each of the battery cells.

9. An electrical device, comprising the battery pack according to claim 1.

10. An electrical device, comprising the battery pack according to claim 2.

11. An electrical device, comprising the battery pack according to claim 8.

* * * * *